United States Patent [19]
Potter et al.

[11] Patent Number: 5,504,748
[45] Date of Patent: Apr. 2, 1996

[54] METHOD OF ERASING SLOTS

[75] Inventors: Philip G. Potter, South Blackburn; Moshe Zukerman, Mount Waverly, both of Australia

[73] Assignee: Telstra Corporation Limited, Australia

[21] Appl. No.: 84,636

[22] Filed: Jun. 29, 1993

Related U.S. Application Data

[63] Continuation-in-part of Ser. No. 838,717, Apr. 17, 1992, abandoned.

[30] Foreign Application Priority Data

Sep. 13, 1989 [AU] Australia ............... PJ6328/89
Mar. 23, 1990 [AU] Australia ............... PJ9281/90
Mar. 23, 1990 [AU] Australia ............... PJ9284/90

[51] Int. Cl.⁶ .................................... H04L 12/417
[52] U.S. Cl. ............... 370/85.6; 370/85.7; 370/85.11
[58] Field of Search ............... 340/825.05, 825.5; 370/85.1, 85.2, 85.4, 85.6, 85.7, 85.11, 94.1, 97

[56] References Cited

U.S. PATENT DOCUMENTS

| | | | |
|---|---|---|---|
| 4,977,557 | 12/1990 | Phung et al. ............... | 370/85.6 |
| 5,081,622 | 1/1992 | Nassehi et al. ............... | 370/85.11 |
| 5,121,388 | 6/1992 | Perdikaris et al. ............... | 370/85.7 |
| 5,124,981 | 6/1992 | Golding ............... | 370/85.6 |
| 5,157,657 | 10/1992 | Potter et al. ............... | 370/85.6 |
| 5,163,047 | 11/1992 | Perdikaris et al. ............... | 370/85.7 |
| 5,214,645 | 5/1993 | Hagirahim ............... | 370/85.7 |
| 5,257,264 | 10/1993 | Yang et al. ............... | 370/85.5 |

Primary Examiner—Benedict V. Safourek
Attorney, Agent, or Firm—Blakely, Sokoloff, Taylor & Zafman

[57] ABSTRACT

A station for a network using a DQDB communications protocol. A counting unit for maintaining an erased count of erased slots, an erasing unit for determining, erasing and outputting slots received on a transmit bus which have been used to transmit data to and have been received by an intended destination on the transmit bus are used. The erased slots are thereafter available for use by stations for data transmission on the transmit bus, and for determining if the erased count is greater than a predetermined value when a request for a slot is received by the station on a request bus and for erasing the request when the erased count is greater than the predetermined value. The erase count may be incremented by the station when a slot is erased by the station. Alternatively the erase count of a station may be incremented only when the station uses an erased slot to transmit data to another station. The counting unit may also include a high priority erase counting unit for maintaining the erase count on the basis of received high priority requests and erased slots used by the station to satisfy a high priority request, and a low priority erase counting unit for maintaining a low priority erased count of erased slots which may be used by succeeding stations to satisfy a low priority request for a slot.

56 Claims, 4 Drawing Sheets

METHOD OF ERASING SLOTS

This is a continuation-in-part of application Ser. No. 07/838,717, filed Apr. 17, 1992, now abandoned.

FIELD OF THE INVENTION

The present invention relates to a method of erasing slots in a network using a Distributed Queue Dual Bus (DQDB) communications protocol and a station for implementing the method.

BACKGROUND OF THE INVENTION

The DQDB protocol and a QPSX network which employs the protocol are described in the specification U.S. Pat. No. 5,157,657 (which corresponds to Australian Patent Application No. 45968/89) and the specifications of U.S. Pat. Nos. 4,922,244 and 5,051,742 derived from International Application No. PCT/AU85/00304 (International Publication No. WO 86/03639). The U.S. patent specifications are herein incorporated by reference. A discussion of the DQDB protocol and a QPSX network are also provided in the report prepared by the IEEE 802/6 Working Group entitled "Proposed IEEE Standard 802.6—Distributed Queue Dual Bus (DQDB) Metropolitan Area Network (MAN)" Draft D10, May 1989, and the International Journal of Digital and Analog Cabled Systems, Vol. 2 179–186 (1989).

In communications networks which employ the DQDB communications protocol, slots which are used to transmit data from one station of the network to another cannot be reused by subsequent stations, along the bus on which the data is transmitted, once the slot has been read by the destination station. Empty slots which can be used for data transmission between stations are only provided by Head of Bus (HOB) units of the network. This is also the case for networks which employ an improved DQDB protocol which enables guaranteed capacity to be allocated to stations in the network. The improved protocol is described in A. Kennington, Guaranteed Bandwidth in Distributed Queuing, Contributions 802.6-90/50-51 to the IEEE 802.6 Working Group, July 1990. Stations which operate on the basis of the basic DQDB protocol are hereinafter referred to as DQDB stations, and stations which operate according to the improved DQDB protocol and are able to provide guaranteed capacity for a priority level are hereinafter referred to as GBW stations.

To increase the capacity of a network which employs a DQDB protocol it is desirable to provide a method and a station for efficiently erasing slots after they have been received by all destinations, specified by their address field, so they can be used again before proceeding to an End of Bus (EOB) unit. Erasing a slot entails resetting the busy bit in the slot's header and, if desired, resetting the information carrying bits of the slot so it may be used by another station to transmit data to a succeeding station. A distributed queue established between stations of the network however should be maintained if slots are erased and made available for use again before reaching an EOB unit.

SUMMARY OF THE INVENTION

In accordance with the present invention there is provided an erase station for a network using a DQDB communications protocol, the station including an eraser for erasing slots received on a transmit bus which have been used to transmit data on said transmit bus, the erased slots thereafter being available for use by stations for data transmission on said transmit bus, and a counter for maintaining an erased count of erased slots, wherein the eraser erases a request for a slot received on a request bus when the erased count corresponding to the request is greater than a predetermined value.

In accordance with the present invention there is also provided a method of erasing slots in a network using a DQDB communications protocol, comprising:

erasing slots received on a transmit bus which have been used to transmit data on the transmit bus, the erased slots thereafter being available for use by stations for data transmission on the transmit bus;

maintaining an erased count of erased slots; and erasing a request received on a request bus when the erased count corresponding to said request is greater than a predetermined value.

BRIEF DESCRIPTION OF THE DRAWINGS

Preferred embodiments of the present invention will now be described, by way of example only, with reference to the accompanying drawings, wherein.

DETAILED DESCRIPTION OF PREFERRED EMBODIMENTS OF THE INVENTION

Figure 1:
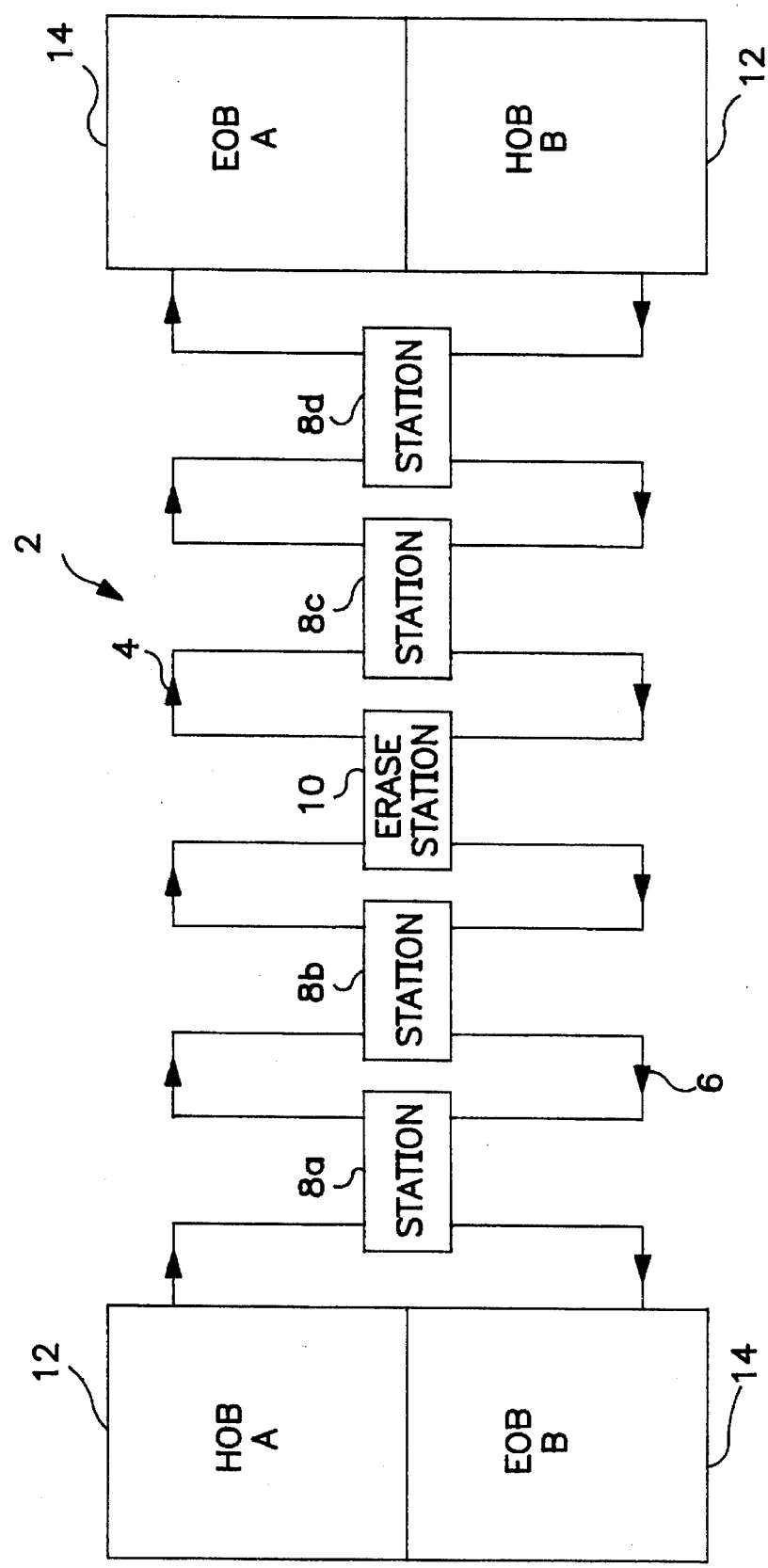
FIG. 1 is a block diagram of a network which uses a DQDB communications protocol and includes a first preferred erase station.

A network 2, as shown in FIG. 1, which employs a DQDB communications protocol includes a bus A 4 for transmitting slots in one direction and a parallel bus B 6 for transmitting slots in the opposite direction, and a plurality of stations 8 and 10 which are connected in parallel between the buses 4 and 6. Respective HOB units 12 and EOB units 14 are used to terminate the ends of the buses 4 and 6, slots being transmitted on a bus 4 or 6 from the respective HOB unit 12 to the respective EOB unit 14. The buses 4 and 6 are used to transmit both data and requests for slots and are preferably serial data lines.

Figure 2:
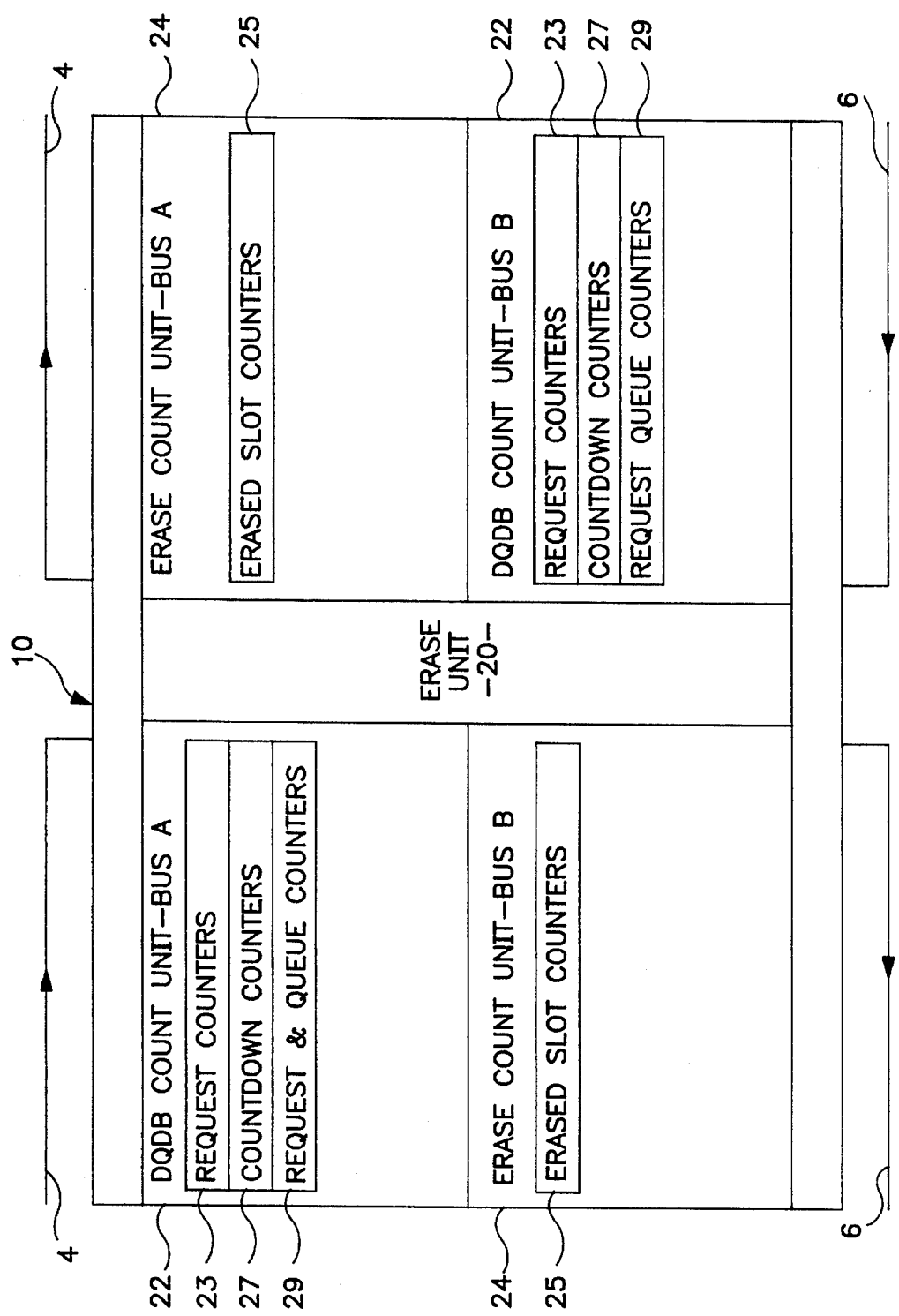
FIG. 2 is a block diagram of the erase station.

The network 2 illustrated in FIG. 1 includes four stations 8, which may be DQDB or GBW stations, and an erase station 10 connected in parallel between the second and third stations 8b and 8c. The erase station 10, as shown in FIG. 2, includes an erase unit 20 which erases slots received on bus A 4 or B 6 which have been used, DQDB count units 22 for both buses 4 and 6 and erase count units 24 for both buses 4 and 6. A DQDB count unit 22 includes request counters 23 for each of the four request priority levels and an erase count unit 24 includes an erased slot counter 25 for each priority level. The request counters 23 operate in the same manner as request counters of DQDB and GBW stations to maintain a record of outstanding slot requests.

The erase station 10 may be dedicated station for erasing slots only or it may be a station which is also able to transmit and receive data on slots in the same manner as the DQDB or GBW stations. A transmitting erase station would include all of the features of a dedicated non-transmitting erase station. In addition, the DQDB count unit 22 of a transmitting erase station includes countdown counters 27 and request queue counters 29 for each priority level and each bus 4 and 6, and circuitry enabling it to access slots for transmitting and receiving data on both buses 4 and 6. The countdown counters 27 and request queue counters 29 also operate in the same manner as those in DQDB and GBW stations. The stations 8 and 10 of the network 2 are configured by standard microprocessor based and controlled high speed data processing components with appropriate software, which are chosen to meet the functional requirements described herein. The circuitry may be similar to that described in the incorporated references listed on page 1.

An erase station 10, for example, is able to erase slots used in transmitting data to it on one bus A 4 from a preceding station 8c or 8d so the erased slots can then be used to transmit data between the succeeding stations 8d and 8e, and similarly it can be used to erase slots used to transmit data on the reverse bus B 6 from the succeeding stations 8d and 8e so that the slots can then be used to transmit data between the preceding stations 8b and 8a. The erasing station 10 can also use the erased slot to transmit data if it is a transmitting erase station.

To simplify the remaining description we will hereinafter describe the operation of the preferred embodiments with respect to data only being transmitted on bus A 4 and request being transmitted on bus B 6. Furthermore, we will also consider the station 10 to be a transmitting station. It is to be understood the description also applies to data transmitted on bus B 6 and requests transmitted on bus A 4 and, in most respects, to non-transmitting erase stations.

According to a first preferred embodiment, the slots received by the erase station 10 on bus 4 are stored in the erase unit 20 until a previous slot received (PSR) bit of the header of the following slot is received. If the PSR bit is high this indicates the stored preceding slot contains information which has been transmitted and received by a preceding station on bus A. To be erased the stored slot must also have a high busy bit in its respective header, as empty slots are returned to bus A unchanged. Thus if the relevant PSR and busy bits are set the stored slot is erased by the station 10 and returned to bus A. A slot is erased, as discussed previously, by resetting, at least, the busy bit in the slot's header. The PSR bit of succeeding slot is also reset to 0. If not erased the stored slot is merely returned to bus A unchanged.

The erase station 10 maintains request and countdown counters 23 and 27, the values of which are $C_r(i)$ and $C_d(i)$, respectively, for each priority level i=0, 1, 2, 3, where 0 is the lowest priority level and three is the highest level. The sum of the request and countdown counters 23 and 27 for a given priority i represents the number of requests outstanding for that priority at the erase station 10. The request and countdown counters 23 and 27 are decremented or incremented according to the DQDB protocol. Therefore, as for a DQDB station, $C_r(i)$ or $C_d(i)$ for all i is decremented by 1 (if not already 0), whenever an empty slot is released by the erase station 10 onto bus A, except this includes both empty slots which are received and created by the station 10. $C_r(i)$ or $C_d(i)$ is also incremented for $i \leq j$ if a request on priority j is received on bus B. For a non-transmitting erase station $C_d(i)=0$ for all i.

The erase station 10 also maintains a request queue counter 29 for each priority level indicating the number of request which the station has queued to send for each priority level i, where the value of the request queue count for priority level i is $C_w(i)$. According to the basic DQDB protocol a station 10 can only transmit and have outstanding one request (i.e. one which has not been granted) at any given time. When a station 10 queues a segment for transmission a request queue counter 29 at the appropriate priority level is incremented to place the segment in the distributed queue.

A request issued by a succeeding station 8c or 8d, which has not been received by a preceding station, but has already been granted, is hereinafter referred to as a stale request. If the erase station 10 erases slots and does not erase requests, the number of stale requests recorded by the station 10 will increase thereby causing unfair usage of capacity by particular stations and wastage of the transmitting capacity of the network 2. The erase station 10 therefore should cancel requests accordingly to ensure the distributed queue for the network 2 is not upset by state requests. Ideally, following erasure of a slot which is subsequently used to satisfy a given priority k request, the erase station immediately, or shortly afterwards, should cancel a priority k request received on bus B 6. This, however, requires the erase station 10 to be able to firstly accurately guess for which priority level an erased slot is to be used and secondly to then locate in a short period of time a request of that priority to cancel. To cancel a request, the erase station 10 may, after erasing a slot, either cancel a request queued according to its request queue counter 29 or wait for a request to arrive on bus B which can be cancelled. To try and achieve the ideal situation discussed above, the erase station 10 operates as follows.

The priority level for which an erased slot is to be used can be estimated by comparing values p and t, where p is the highest priority level for which the sum of the corresponding request and countdown counters 23 and 27 is greater than 0 ($C_r(i)+C_d(i)>0$), p being equal to −1 if the request and countdown counters 23 and 27 are 0 for all values of i, and t is the highest priority level at which the erase station 10 has a segment queued and waiting to be transmitted, t being equal to −1 if there are no segments queued for transmission at any priority level. If p>t, the erased slot will probably be used to satisfy a priority p request issued by a succeeding station 8c or 8d, whereas if t>p the erased slot will probably be used by the erase station 10 to transmit a segment queued at priority t. If t=p the erased slot may be used either by the erase station 10 or by one of the succeeding stations 8c, 8d at priority t. Therefore, an erased slot is most likely to be used to satisfy a request at priority m, m being the highest value of p or t, m=max(p,t).

The erased slot counters 25, provided for each priority level, record the number of slots erased for the purpose of future request cancellation, and the value of the counters are $C_e(i)$ for i=0, 1, 2, 3. After the erase station 10 erases a slot, the priority m erased slot counter 25 of the station 10 is incremented if $m \geq 0$. When a request is to be cancelled or not. In particular, if a priority k request arrives on bus B, and $C_e(k)>0$, the request is cancelled, or erased and the priority k erased slot counter 25 is decremented by 1.

If after erasing a slot m=−1, no erased slot counter 25 should be incremented because the erase station 10 does not plan to cancel any future requests because it appears that none of the succeeding stations 8 will use the erased slot.

When the erase station 10, after the erased slot counters 25 have been updated releases an empty slot received from a preceding station 8a or 8b, or a slot which has just been erased, the station 10 decrements its positive request and countdown counters 23 and 27 for all priorities, according to the DQDB protocol.

When the station 10 receives a slot with an empty priority k request field on bus B, the erase station examines its priority k request queue counter 29 and its priority k erased slot counter 25. If $C_w(k)$ and $C_e(k)$ are both greater than 0 then they are both decremented by 1 and the priority k request field is not set to 1. If, however, the priority k erased slot counter is 0 and $C_w(k)>0$, the empty priority k request field is set to 1 by the station 10 and the priority k local request queue counter 20 is decremented by 1, according to the DQDB protocol.

When a request at priority level k arrives on bus B at the erase station 10, the station 10 updates its request and countdown counters 23 and 27 according to the DQDB protocol. Therefore, $C_r(i)$ or $C_d(i)$ is incremented for all priority levels i such that $i \leq k$. If, the erased slot counter for priority level k is positive, then the request is erased and the priority k erased slot counter 25 is decremented by 1.

From the above, it will be apparent the erase station 10 decrements all of its positive request and countdown counters 23 and 27 when an erased or empty slot is released on bus A in anticipation of the slot being used to satisfy the highest priority level request queued or recorded at the station 10. The request and countdown counters 23 and 27 of the station 10 are then incremented according to the DQDB protocol when requests are received on bus B from succeeding stations 8c and 8d. The erased slot counts are maintained and used to determine whether a request received on bus B by the station 10 is to be erased or allowed to proceed to the stations 8a and 8b which precede the erase station 10 on bus A. The erased slot counters are used to prevent stale requests being sent to the preceding stations and upsetting the distributed queue of the network 2. Furthermore, if the erase station 10 is a transmitting station and the erased slot is to be used to satisfy a queued request of the station 10, then an empty request field can be left unchanged when received, and a request queue counter 29 of the station 10 decremented accordingly.

A number of variations can be made to the method described above to achieve the same effect. For example, when an erased slot counter 25 is incremented for a given priority, the station 10 can examine its local request queue counter 29 for that priority and if found to be positive, the station 10 could decrement both counters 25 and 29 by 1. Furthermore, whenever the local request queue counter 29 is incremented, the erase station 10 could examine its erased slot counter 25 for that priority and if found to be positive, the station 10 would decrement both counters 25 and 29 1.

The network 2 may be monitored and controlled by a central controller, which would adjust the traffic capacity of sections of the network 2, as desired. An erase station 10 may be used by the controller to assist in adjusting capacity allocations. For instance, the controller may adjust the number of request erased by the station 10 by adjusting the level of at least one of the erased slot counters 25, i.e. the erased counts may be incremented and decremented accordingly to achieve a desired capacity distribution.

Figure 3:
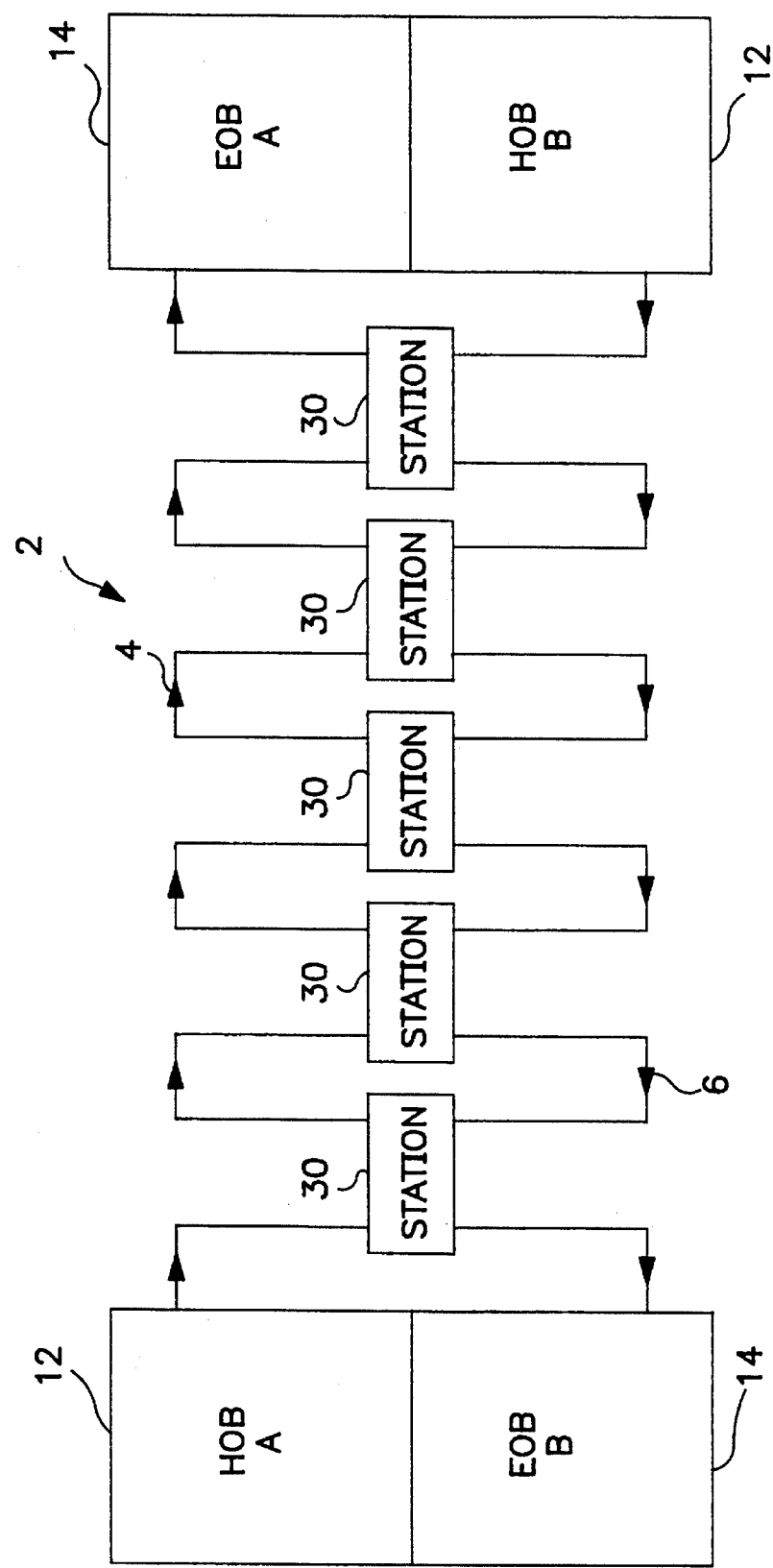
FIG. 3 is a block diagram of a network which uses a DQDB communications protocol and includes second preferred erase stations.

According to a second preferred embodiment, the stations of the network 2, as shown in FIG. 3, are all transmitting erase stations 30 which invoke destination release, whereby slots are erased when they are received by the destination station, i.e. the station for which the data carried by the slot is intended.

The slots received by an erase station 30 on bus 4 either contain information which has been transmitted from a preceding station or are empty, as denoted by the state of the busy bit in the header of each slot. To be erased the slot must have a set or high busy bit and a destination address in its respective header which indicates the information contained therein is destined for the station 30. The slot's information or data field is erased and its header marked with a released unassigned flag. Alternatively, the slot is erased by simply inserting the released unassigned flag and its information field is overwritten when it is reused by a succeeding station. Empty slots are returned to bus A unchanged. The released unassigned flag is used so succeeding stations can distinguish erased slots from empty slots.

Instead of trying to predict for which priority level i an erased slot is going to be used and then incrementing the appropriate erased slot counter $C_e(i)$ of the station 30 erasing the slot as for the first embodiment, on erasing a slot, the erasing station 30 does not adjust one of its erased slot counters 25. When a subsequent station 30 accesses the slot for transmission purposes and detects the released unassigned flag, the accessing station 30 increments its erased slot counter $C_e(i)$ 25 corresponding to the priority level i for which that station 30 uses the erased slot. The remaining steps of the previous method executed by the first erase station 10 are implemented unchanged by the second erase station 30, such as those relating to decrementing erased slot counters, cancelling issued requests, and not issuing queued requests. For example, when a station 30 releases an empty slot received from a preceding station, or a slot which has just been erased, on bus A, the station 30 decrements its positive request and countdown counters 23 and 27 for all priorities, according to the DQDB protocol. The erase stations 10 and 30 are the same except for the alterations required to execute the second slot erasing method, such as adjusting the erase unit 20 to insert the released unassigned flag and changing the manner in which the erased counters are incremented.

In order to maintain consistency of the second slot erasing method with the Bandwidth Balancing (BWB) scheme described in the IEEE 802.6 standard mentioned previously, a slot which is deliberately left unused by the BWB state machine in a station 30, when otherwise that station 30 could have used that slot, must also be marked with the released unassigned flag.

The second embodiment is advantageous as it is more accurate and efficient than the first embodiment because instead of trying to predict the priority level for which an erased slot is going to be used, an erased slot counter 25 is incremented corresponding to the actual priority level for which the erased slot is used. The first embodiment is accurate and effective in situations when one priority level is used as there is no error in the prediction.

Figure 4:
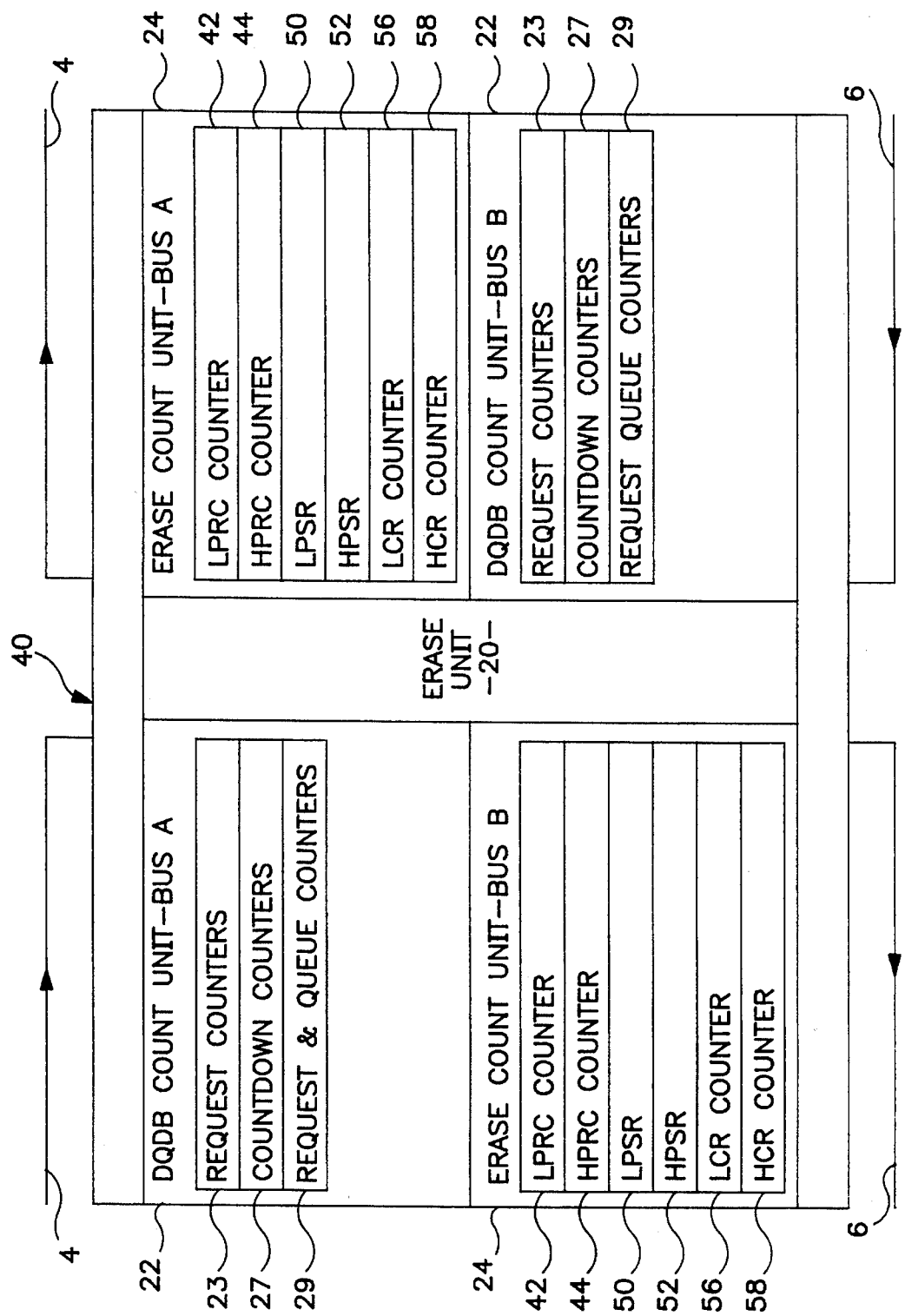
FIG. 4 is a block diagram of the third preferred erase station.

One difficulty associated with the second embodiment, however, is that intervening stations, between the erasing station 30 and the station 30 which reuses the slot, decrement their request and countdown counters 23 and 27 accordingly as they pass the erased slot. The intervening stations effectively cancel a request before the reusing station cancels a request, on the basis of its incremented erased slot counter 25. The intervening stations are therefore granted earlier access to slots which is unfair to succeeding stations. This difficulty can be alleviated in situations where only two kinds of priority levels, high and low are employed and when the DQDB protocol is employed only for the low priority level, such as DQBI stations discussed below. For example, level three may not be used and priority levels one and two may be designated high and priority level zero may be designated low. In this situation, according to a third preferred embodiment of the present invention, the erased slot counters 25 of every station 30 are replaced by a low priority request cancellation (LPRC) counter 42 and a high priority request cancellation (HPRC) counter 44 to form a third form of erase station 40, as shown in FIG. 4. The station 40 is also a destination release station and can form a network in the same manner as shown in FIG. 3 for the network 2 formed using the second erase station 30.

On receiving a high or low priority request, each of the stations 40 cancel the request if their corresponding LPRC or HPRC counter 42 or 44 is positive (>0), and decrement the counter accordingly. The LPRC and HPRC counters 42 and 44 are, and function as, high and low priority erased slot counters 25. On implementing these two counters, the following third erasing method is employed:

1. On releasing an erased slot, the erasing station 40 increments its LPRC counter 42 on the basis that it assumes the erased slot will be used for a low priority transmission. The request and countdown counters 23 and 27 are adjusted as if an empty slot has been allowed to pass, according to the DQDB protocol.

2. A station 40 using a slot which has the released unassigned flag set, indicating it is an erased slot, performs no additional steps if the slot is used for a low priority transmission. However, if the slot is used for a high priority transmission, then the reusing station increments its HPRC counter 44 and sends a low priority request on the reverse bus. Issuance of the low priority request corrects the request and countdown counters 23 and 27 of the preceding stations until the low priority request is cancelled by the erasing station 40.

At the end of certain busy periods, the LPRC and HPRC counters 42 and 44 may still be set and represent information which is stale and irrelevant. In other words, the counters 42 and 44 may still indicate that a request needs to be cancelled long after the corresponding cell has been erased. It is therefore advantageous to be able to decrement the counters 42 and 44 accordingly, when the information they represent becomes stale after a predetermined period of time.

To achieve this the stations 40 each include two additional shift registers 50 and 52 for each bus A 4 and B 6 as shown in FIG. 4, each being one bit wide and having a length equal to twice the bus length. The bus length is the number of slots present on each bus A 4 and B 6 at any given time, and may be, for example, 50 slots. One is for higher priority request cancellation and called the high priority shift register (HPSR 52, and the other is for low priority and is called the low priority shift register (LPSR) 50, as shown in FIG. 4. When a station erases and releases a slot, a high bit 1, is placed at the start of the LPSR 50 and its LPRC 42 counter is incremented. Otherwise a low bit, 0, is placed at the start of the LPSR 50. Both shift registers 50 and 52 are shifted each time a slot passes the respective station 40.

On reusing an erased slot for a high priority transmission a station 40 places a high bit, 1, at the start of its HPSR 52 and, as described previously, increments its HPRC 44 counter. Otherwise when the register is shifted a zero is placed at the start of the register 52.

The stations also each include two further new counters for each bus A 4 and B 6, a high priority cancel request (HCR) and a low priority cancel request (LCR) counter 58 and 56, respectively.

When a station 40 cancels a low or high priority request, the station increments its LCR or HCR counter 56 or 58, respectively, as well as decrementing its LPRC or HPRC counter 42 or 44, respectively. When a 1 is shifted from the end of a station's HPSR 52, the HCR 58 of the station 40 is decremented if it is greater than zero, whereas the station's HPRC 44 is decremented if the HCR 58 is equal to zero. Similarly, when a 1 is shifted from the end of the LPSR 50 of the station, the station's LCR 56 is decremented if it is greater than zero, whereas if it is zero then the LPRC 42 of the station 40 is decremented. Therefore on the basis of the cancel request counters 56 and 58 and the shift registers 50 and 52, a station is able to monitor request cancellation and determine when the contents of its LPRC or HPRC 42 or 44 has become stale and irrelevant.

Erased slot counters 25 employed in the first and second embodiments can also similarly be adjusted when a predetermined period of time has expired to prevent the retention of the relevant information. For example, appropriate similar shift registers and cancelled request counters can be included to determine when the erased slot counters 25 need to be decremented.

The additional counters and shift registers 42, 44, 50, 52, 56 and 58 which need to be included and employed in the stations 40 are implemented by making changes to the control software of the stations, and utilising available sections of memory to store the counts and act as the shift registers. Alternatively, standard counter and/or shift register circuitry may be added.

The third embodiment therefore employs the prediction technique of the first embodiment by restricting the prediction to only the low priority level, and implements the method of the second embodiment for the high priority level, with the exception that a low priority level request is issued to correct the distributed queue for any intervening stations. The method of the third embodiment is particularly advantageous for use in networks which employ DQBI stations described in Australian Patent Application No. 30329/92.

We claim:

1. A station for a network using a DQDB communications protocol, comprising:

counting means for maintaining an erased count of erased slots; and erasing means for determining, erasing and outputting slots received on a transmit bus which have been used to transmit data to and have been received by an intended destination on said transmit bus, said erased slots thereafter being available for data transmission on said transmit bus, and for determining if said erased count is greater than a predetermined value when a request for a slot is received by said station on a request bus and for erasing said request when said erased count is greater than said predetermined value.

2. A station as claimed in claim 1, wherein said counting means includes outstanding counting means for maintaining an outstanding count of outstanding requests for slots and erased counting means for maintaining said erased count.

3. A station as claimed in claim 2, wherein said erasing means decrements said outstanding count when an erased slot is outputted by said station.

4. A station as claimed in claim 3, wherein said erasing means increments said outstanding count when said request is received and decrements said erased count when said request is erased.

5. A station as claimed in claim 1, wherein said erasing means increments said erased count when a slot is erased.

6. A station as claimed in claim 5, wherein said erasing means decrements said erased count if said erased count is greater than a predetermined value and said station requires use of a slot for transmission on said transmit bus.

7. A station as claimed in any one of claims 2 to 6, wherein said counting means maintains an outstanding count and an erased count for a request priority level.

8. A station as claimed in claim 7, wherein said erasing means predicts the priority level for which an erased slot is to be used on the basis of said outstanding count and increments the erased count at said priority level, accordingly.

9. A station as claimed in claim 8, wherein said priority level is predicted on the basis of said outstanding count and on the basis of data or segments the station has queued for transmission.

10. A station as claimed in claim 8, wherein said erasing means on erasing a slot increments said erased count at the highest priority level for which a request is outstanding or about to be sent by said station.

11. A station as claimed in claim 7, wherein said erasing means on erasing a slot increments said erased count at priority level m, m being the maximum of p and t, where p is the highest priority level for which said outstanding count is greater than a predetermined value and t is the highest priority level at which the station has a segment queued for transmission.

12. A station as claimed in claim 7, wherein said erasing means decrements said outstanding count at each priority level when an erased slot is outputted.

13. A station as claimed in claim 12, wherein if said erased count is greater than a predetermined value and said station has queued a priority k request for sending and a slot with a corresponding empty request bit is received on a request bus, said erasing means inhibits setting of said request bit to send the request, decrements the priority k erased count and updates the outstanding counts as if said priority k request had been sent.

14. A station as claimed in any one of claims 1 to 6, wherein said station includes means for storing a slot until a previous slot received bit of the header of the succeeding slot is received by the station, and said erasing means erases the stored slot when said bit is set.

15. A station as claimed in any one of claims 1 to 6, wherein said predetermined value is zero.

16. A network which employs a DQDB communications protocol having at least one station as claimed in any one of claims 1 to 6.

17. A station as claimed in claim 1, wherein said erased count maintained by said counting means is a count of erased slots used by the station to transmit data on said transmit bus.

18. A station as claimed in claim 17, wherein said erased count is incremented when an erased slot is used by said station for transmission.

19. A station as claimed in any one of claims 1 to 4, 17 and 18, wherein said request is assigned a high or low priority level and said counting means includes a high priority erased counting means for maintaining said erased count on the basis of received high priority requests and erased slots used by the station to satisfy a high priority request, and a low priority erased counting means for maintaining a low priority erased count of erased slots which may be used to satisfy a low priority request for a slot.

20. A station as claimed in claim 19, wherein said low priority erased count is incremented when said station erases a slot.

21. A station as claimed in claim 20, wherein when said erased count of said high priority erased counting means is incremented said station issues a low priority request.

22. A station as claimed in claim 21, wherein said outstanding count is maintained for each request priority level, and the outstanding counts are incremented, respectively, when said request of the corresponding priority level is received and the erased counts are decremented, respectively, when said request of the corresponding priority level is erased.

23. A station as claimed in claim 22, including high and low priority shift register means having data which is shifted when a slot passes said station and which are loaded with predetermined data when the high and low priority erased counts are incremented, respectively.

24. A station as claimed in claim 23, wherein said counting means includes means for maintaining high and low priority cancel request counts which are incremented when high and low priority request are erased, respectively, and decremented when said predetermined data is shifted out of said high and low priority shift register means, respectively, said high and low priority erased counts being decremented when the respective cancel request count reaches a predetermined value and said predetermined data is shifted out of the respective shift register means.

25. A station as claimed in claim 24, wherein said shift register means have a length equal to the number of slots on said transmit bus and said request bus.

26. A station as claimed in any one of claims 1 to 4, 17 and 18, including means for marking an erased slot by a flag in the header of said erased slot.

27. A station as claimed in claim 26, wherein after receiving a slot destined for said station, said station erases the received slot destined for said station by setting said flag.

28. A station as claimed in claim 24, wherein said predetermined value is zero.

29. A method of erasing slots in a network using a DQDB communications protocol, comprising:

maintaining for a station of said network an erased count of erased slots;

determining, erasing and outputting slots received on a transmit bus which have been used to transmit data to and have been received by an intended destination on said transmit bus, the erased slots thereafter being available for data transmission on said transmit bus;

determining if said erased count is greater than a predetermined value when a request for slot is received by said station on a request bus; and erasing said request when said erased count is greater than said predetermined value.

30. A method as claimed in claim 29, wherein said method includes maintaining an outstanding count of outstanding requests for slots.

31. A method as claimed in claim 30, wherein said outstanding count is decremented when an erased slot is outputted by said station.

32. A method as claimed in claim 31, wherein said outstanding count is incremented when said request is received, and said erased count is decremented when said request is erased.

33. A method as claimed in claim 29, wherein said erased count is incremented when a slot is erased.

34. A method as claimed in claim 33, wherein said erased count is decremented if said erased count is greater than a predetermined value and said station requires use of a slot for transmission on said transmit bus.

35. A method as claimed in any one of claims 29 to 34, wherein said method involves maintaining at said station an outstanding count and an erased count for a request priority level.

36. A method as claimed in claim 35, including predicting the priority level for which an erased slot is to be used on the basis of said outstanding count and incrementing the erased count at said priority level, accordingly.

37. A method as claimed in claim 36, wherein said priority level is predicted on the basis of said outstanding count and on the basis of data or segments the station has queued for transmission.

38. A method as claimed in claim 36, wherein when a slot is erased said erased count is incremented at the highest priority level for which a request is outstanding or about to be sent by said station.

39. A method as claimed in claim 35, wherein when a slot is erased said erased count is incremented at priority level m, m being the maximum of p and t, where p is the highest priority level for which said outstanding count is greater than a predetermined value and t is the highest priority level at which the station has a segment queued for transmission.

40. A method as claimed in claim 35, wherein said outstanding count is decremented at each priority level when an erased slot is outputted.

41. A method as claimed in claim 40, wherein if said erased count is greater than a predetermined value and said station has queued a priority k request for sending and a slot with a corresponding empty request bit is received on a request bus, said request bit is not set to send the request, the priority k erased count is decremented and the outstanding counts are updated as if said priority k request had been sent.

42. A method as claimed in any one of claims 29 to 34, wherein said method includes storing a slot until a previous slot received bit of the header of the succeeding slot is received, and erasing, said slot when said bit is set.

43. A method as claimed in any one of claims 29 to 34, wherein said predetermined value is zero.

44. A method as claimed in any one of claims 29 to 34, wherein said erased count is adjusted to adjust a capacity allocation.

45. A method as claimed in claim 29, wherein said erased count is a count of erased slots used by said station to transmit data on said transmit bus.

46. A method as claimed in claim 45 wherein said erased count is incremented when a slot is used by said station.

47. A method as claimed in any one of claims 29 to 32, 45 and 46, wherein said request is assigned a high or low priority level and said erased count is a high priority erased count maintained on the basis of received high priority requests and erased slots used by the station to satisfy a high priority request, and said method includes maintaining for said station a low priority erased count of erased slots which may be used to satisfy a low priority request for a slot.

48. A method as claimed in claim 47, wherein said low priority erased count is incremented when said station erases a slot.

49. A method as claimed in claim 48, including issuing a low priority request from said station when said high priority erased count is incremented.

50. A method as claimed in claim 49, wherein said outstanding count is maintained for each request priority level, and the outstanding counts are incremented, respectively, when a said request of the corresponding priority level is received, and the high and low priority erased counts are decremented, respectively, when a said request of the corresponding priority level is erased.

51. A method as claimed in claim 50, including shifting data in high and low priority shift registers when a slot passes said station, and loading said shift registers with predetermined data when the high and low priority erase counts are incremented, respectively.

52. A method as claimed in claim 51, including maintaining for said station high and low priority cancel request counts which are incremented when high and low priority requests are erased, respectively, and decremented when said predetermined data is shifted out of said high and low priority shift registers, respectively, said high and low priority erased counts being decremented when the respective cancel request count reaches a predetermined value and said predetermined data is shifted out of the respective shift register.

53. A method as claimed in claim 52, wherein said shift registers have a length equal to the number of slots on said transmit bus and said request bus.

54. A method as claimed in claims 29 to 34, 45 and 46, including marking an erased slot by a flag in the header of said erased slot when said erased slot is erased.

55. A method as claimed in claim 54, wherein after receiving a slot destined for said station, said station erases the received slot destined for said station by setting said flag.

56. A method as claimed in claim 52, wherein said predetermined value is zero.

* * * * *

UNITED STATES PATENT AND TRADEMARK OFFICE
CERTIFICATE OF CORRECTION

PATENT NO. : 5,504,748
DATED : APRIL 2, 1996
INVENTOR(S) : Potter et al.

It is certified that error appears in the above-indentified patent and that said Letters Patent is hereby corrected as shown below:

In column 2 at line 61 please delete " be dedicated " and insert
-- be a dedicated --.

In column 3 at line 24 please delete " request " and insert -- requests --.

In column 3 at line 63 please delete " request " and insert -- requests --.

In column 4 at line 14 please delete " state " and insert -- stale --.

In column 4 at line 51 please delete " When a request is " and insert
-- When a request arrives on bus B, the corresponding erased slot
counter 25 determines whether the request is --.

UNITED STATES PATENT AND TRADEMARK OFFICE
CERTIFICATE OF CORRECTION

PATENT NO. : 5,504,748
DATED : APRIL 2, 1996
INVENTOR(S) : Potter et al.

It is certified that error appears in the above-indentified patent and that said Letters Patent is hereby corrected as shown below:

In column 5 at line 7 please delete " 20 " and insert -- 29 --.

In column 7 at line 43 please delete " (HPSR " and insert -- (HPSR) --.

In column 10 at line 37 please delete " for slot " and insert -- for a slot --.

Signed and Sealed this

Twenty-third Day of July, 1996

Attest:

BRUCE LEHMAN

Attesting Officer      Commissioner of Patents and Trademarks